July 28, 1970        D. RISTER        3,521,903

FLEXIBLE SAFETY GUARD

Filed Jan. 25, 1968        2 Sheets-Sheet 1

INVENTOR
DWIGHT RISTER

BY
Woodard, Weikart, Emhardt & Naughton
Attorneys

July 28, 1970  D. RISTER  3,521,903
FLEXIBLE SAFETY GUARD
Filed Jan. 25, 1968  2 Sheets-Sheet 2

INVENTOR
DWIGHT RISTER
BY
Woodard, Weikart, Emhardt & Naughton
Attorneys

United States Patent Office
3,521,903
Patented July 28, 1970

3,521,903
FLEXIBLE SAFETY GUARD
Dwight Rister, 1921 E. 12th St.,
Indianapolis, Ind. 46201
Filed Jan. 25, 1968, Ser. No. 700,476
Int. Cl. B62d 25/16
U.S. Cl. 280—154.5                          1 Claim

ABSTRACT OF THE DISCLOSURE

A safety guard or mudflap with spring steel strips molded in or fastened on a rubber sheet to provide a desired configuration and yet accommodate limited deformation to avoid damage and tearing. Brackets affixed to the strips and readily mountable and affixable to a vehicle for thereby supporting the sheets at the desired locations. Strips of highly reflective material extending on rear faces of the flaps from the lower margins thereof upward to points near the top margins thereof to alert following motorists.

BACKGROUND OF THE INVENTION

Field of the invention

The invention relates generally to highway safety and more particularly to a mudflap useful on truck tractors and semitrailers and constructed for improved operation and to alert vehicle drivers following semitrailers.

Description of the prior art

Mudflaps are well known and widely used behind the rear wheels of truck tractors and semitrailers. The purpose is to prevent stones and other debris from being thrown up by the wheels into the path of vehicles following the tractors and semitrailers. Sometimes, however, the purpose is not achieved because at substantial highway speeds the flaps are deflected by air currents to the extent that they are out of position to prevent throwing of stones and other debris into the path of following vehicles. Some states have passed laws intended to require operators to put something on mudflaps to minimize the deflection ("sailing") thereof by air currents. At best however, the means heretofore used have not been entirely satisfactory.

Examples of such prior art are cited in applicant's prior applications, Ser. No. 358,453, filed Apr. 9, 1964, and Ser. No. 447,845, filed Apr. 13, 1965, both now abandoned.

Another shortcoming of mudflaps heretofore known is the fact that many of those having characteristics intended to prevent "sailing" are subject, during operation, to a type of damage not often experienced with previously with conventional mudflaps.

Another hazard to following vehicles is presented by semitrailers and tractors which are "bobtailing" (operating without trailers) because they are sometimes difficult to distinguish from the rear at nighttime. For example, even where they have lights on the rear which are working, it is sometimes too difficult to distinguish the lights from miscellaneous red and yellow lights in the panorama including, for example, traffic signals, automobile tail lamps and signs.

Moreover, because semitrailers do not have rear bumpers at a level which would be engaged by the front bumpers of automobiles, an automobile driver can accidentally drive so close into the rear of a semitrailer that the first contact with the automobile is between the semitrailer body and the windshield of the automobile.

It is, therefore, a general object of the present invention to provide a device for improving traffic and highway safety.

A further object is to provide a mudflap which functions properly under all driving conditions to control the stone and debris thrown by tractor and semitrailer wheels.

A still further object is to provide a device which aids in alerting vehicle drivers to the presence of a tractor or semitrailer ahead.

A still further object is to provide a device achieving the foregoing objects and which can be readily and inexpensively incorporated on any existing truck tractor or semitrailer, including the type of semitrailers having a slidable tandem axle assembly.

SUMMARY

Described briefly, in a typical embodiment of the present invention, a heavy flexible rubber sheet is provided with a pair of parallel strips of spring steel having a normal unstressed configuration and urging the sheet to conform to that configuration. The strips have portions affixed to a bracket which is affixed in turn to the vehicle, whereby the sheet is properly located as well as its configuration maintained. Bright reflecting strips are suitably provided and located on the assembly.

BRIEF DESCRIPTION OF THE DRAWINGS

The full nature of the invention will be understood from the accompanying drawings and the following description and claim.

DESCRIPTION OF THE PREFERRED EMBODIMENTS

Figure 1:
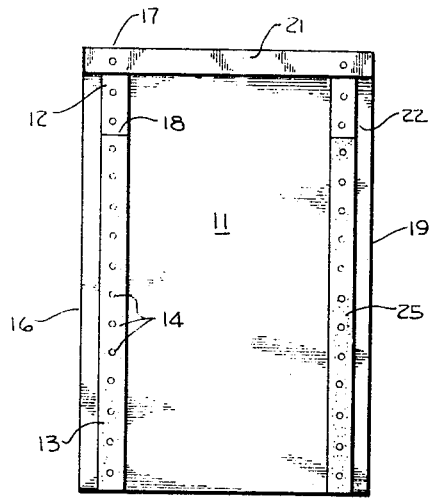
FIG. 1 is a rear face view of a mudflap according to a typical embodiment of the present invention.

Referring now to the drawings in detail, the mudflap in FIG. 1 employs a rectangular sheet 11 of a flexible material which is non-reverberant to sound. The rubber material commonly used in mudflaps is satisfactory for this purpose. A first spring steel strip 12 of black coil oil tempered spring steel hardened C–1095 about .032 inch thick (depending on the length of the mudflap) is provided with a strip of bright-colored red light-reflective adhesive-backed sheeting 13 thereon. A sheeting material suitable for this purpose is sold by the 3M Company under the trade name "Scotchlite" reflective sheeting. The combination of the black coil oil tempered hardened C–1095 spring steel strip and the reflective sheeting strip may then be secured to the sheet 11, which will be hereinafter referred to as a rubber sheet, by the use of a series of screws and lock nuts 14 vertically spaced down the strip. It is preferable, however, to sandwich the rubber sheet between strip 12 and a spring steel strip 12F on the front face 28 of the mudflap, and then fasten the parts together by means of the screws and nuts. Strip 12F is identical to strip 12 but, of course, may have the sheeting 13 omitted therefrom. The strips 12 and 12F are parallel to the left-hand side marginal edge 16 of the rubber sheet and extend from the lower marginal edge of the sheet to the top marginal edge 17 of the sheet, but the reflective sheeting can be terminated well below the upper edge, if desired. In the embodiment shown, the reflective sheeting is terminated at the line 18.

A variety of compositions of spring steel can be used so long as the spring steel is such that a twenty inch long homogeneous rectangular strip of rectangular cross section, .032 inch thick, can be bent until its ends touch, without taking a permanent set. If it meets this requirement, it is "spring steel" so far as this application is concerned. The lowest cost composition meeting this requirement would be most desirable.

An identical assembly of spring steel strip 22, 22F, and reflective sheeting strip is provided adjacent the right marginal edge 19 of the sheet 11. The spring steel strips are normally in a planar form and will strongly tend to remain so. Therefore, they hold the sheet 11 in opposition to any forces tending to bend the sheet 11 with respect to a horizontal axis.

An additional strip 21 of steel, which may be cold roll steel, if desired, is secured to two of the vertical strips and extends across the rubber sheet adjacent the upper marginal edge 17 thereof. By being secured to the upper portions of the spring steel strips 12 and 22, the strip 21 tends to hold strips 22 and 12 in a common plane with the strip 21.

Figure 2:
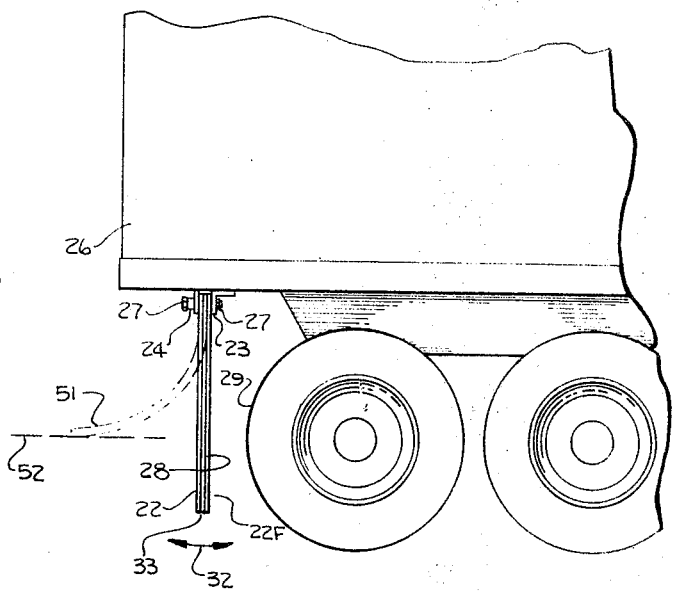
FIG. 2 is a fragmentary side elevational view of a semitrailer having the mudflap of FIG. 1 mounted thereto.

The assembly shown in FIG. 1 may be mounted to the structure of a semitrailer as shown in FIG. 2 by sandwiching the strip 21, the upper portions of strips 12, 12F, 22, 22F and sheet 11 between an angle iron 23 and pipe 24, either of which is welded or bolted to the body 26 of the semitrailer, with the one which is not welded being bolted by means of the bolts 27. In the illustrated example, the angle iron 23 is welded to the semitrailer body and the bolts 27 pass through apertures in the angle iron and the pipe 24 as well as the strip 21 and sheet 11 of the mudflap to secure the mudflap to the semitrailer body. The upper end portions of strips 12 and 12F and 22 and 22F, between iron 23 and pipe 24, as well as strip 21, are thereby affixed to the semitrailer body. The location is such that the front face 28 of the mudflap is eight inches behind the rearwardmost point 29 of the rear wheels 31 of the semitrailer.

This mounting of the mudflap, together with the construction thereof described with reference to FIG. 1, prevents the mudflap from swinging to the front and rear in the direction of the arrows 32, and also minimizes flexing of the mudflap in this direction. It, therefore, controls the height of the lower edge 33 of the mudflap and prevents it from flying even during high speed highway operations. It therefore protects vehicles following the semitrailer from the stone and debris throwing tendencies of the rear wheels of the semitrailer.

In addition to this safety feature of the mudflap of the present invention, the reflective sheeting also alerts drivers both in daytime and nighttime, so that they will be aware of the presence of the semitrailer ahead. They also assist in his judging the distance to the semitrailer.

By employing the spring steel strips according to the present invention, the mudflap can be abused in many ways, such as by backing against loading docks, for example, but will not be permanently distorted. Therefore the flap will always return to its normal operating position for normal operation on the highway. For another example, with the upper ends of the strips 22 and 22F and 12 and 12F affixed with respect to the trailer body 26, the flap can be bent so that the strips 22 and 22F and 12 and 12F define curves as at 51 (FIG. 2) tangent a horizontal plane 52, but upon release of the deflecting force, the springiness of the strips will return them to the vertical position. Of course the strips 12, 12F and 22 and 22F on the flaps are stiff enough to prevent this degree of bending by air currents at maximum highway speeds. If desired, they can be made to substantially eliminate any bending at all by air currents at maximum highway speeds. Also, by having the strips extend the full height of the flap, there is no high stress location in the rubber, and long life is assured.

Figure 3:
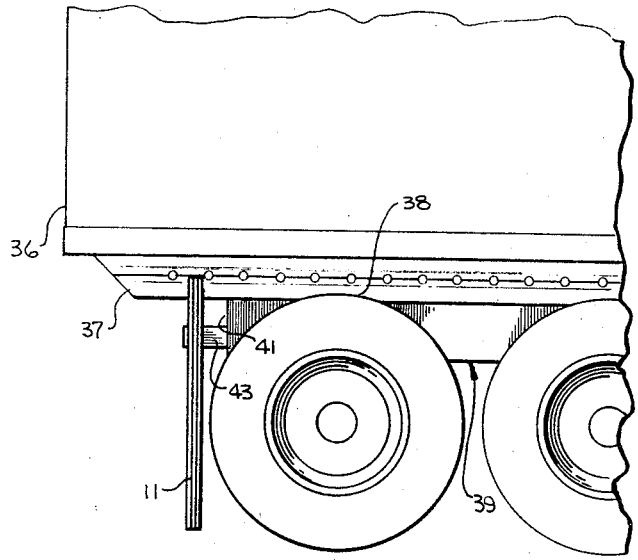
FIG. 3 is a fragmentary side elevational view of a semitrailer having a slidable tandem axle assembly and having a second embodiment of the present invention incorporated therein.
Figure 4:
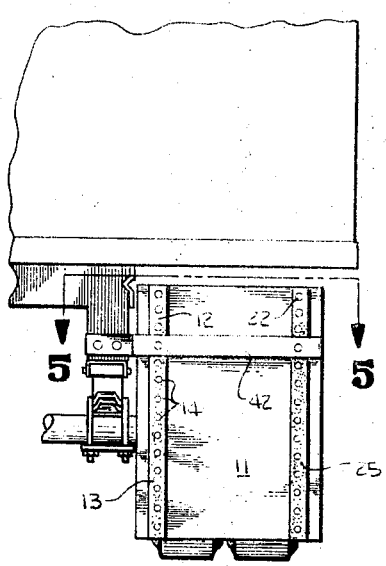
FIG. 4 is a fragmentary rear elevational view of the arrangement of FIG. 3.
Figure 5:
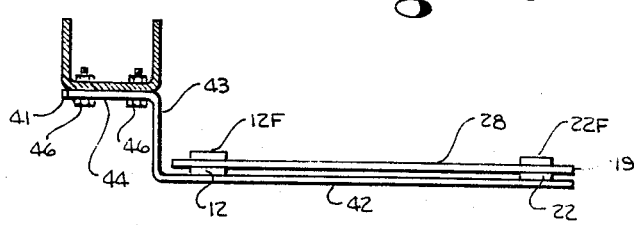
FIG. 5 is a section taken along the line 5—5 in FIG. 4 and viewed in the direction of the arrows.

Some semitrailers have tandem axle assemblies which are slidable with respect to the body of the semitrailer. FIGS. 3 through 5 show a mudflap employed on such semitrailers according to the present invention. Referring now to these figures specifically, a semitrailer body 36 has frame rails 37 thereunder having a plurality of apertures 38, this arrangement accommodating the forward and rearward movement and selection of position of the tandem axle assembly 39. The tandem axle assembly has a framework providing a rear surface 41 which supports the mudflap in cantilever fashion according to this invention. The mudflap itself includes a sheet 11, the spring steel strips 12, 12F, 22 and 22F, and reflective sheeting strips 13 and 25, all of these components being given the same reference numerals as in FIG. 1 because they are substantially the same. However, to accommodate mounting to the slidable tandem axle assembly, the horizontal steel strip 42 is mounted lower on the flap and is secured thereto by two of the attachment screws 14 possibly of somewhat greater length than the other. Strip 42 has a forwardly extending portion (FIG. 5) 43 from which the mounting portion 44 extends parallel to the flap. It is secured to the frame of the tandem assembly by suitable fasteners such as bolts 46, for example. The strip 42, 43, 44 is sufficiently sturdy to prevent flapping and pivoting of the flap by air currents as the trailer is driven even at substantial highway speeds. It too may preferably be made of spring steel. Any slight flexing of the sheet 11 itself which is caused by air currents, is resisted by the strips 12 and 22 which quickly restore the sheet to its normal flat condition.

Figure 6:
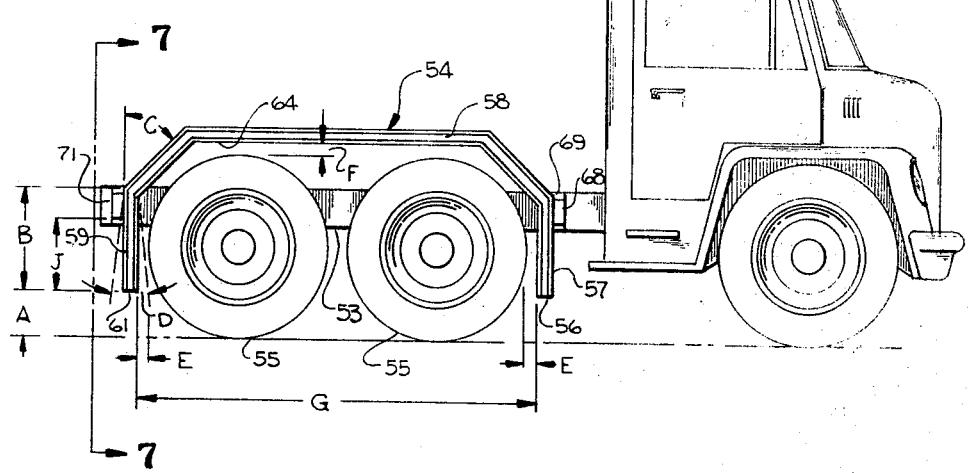
FIG. 6 is a side elevational view of a tractor incorporating another embodiment of my invention.
Figure 8:
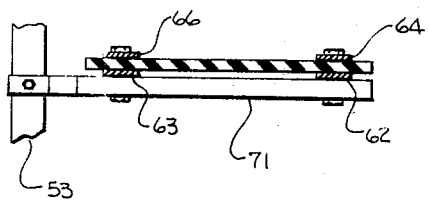
FIG. 8 is an enlarged fragmentary top plan section taken at line 8—8 in FIG. 7 and viewed in the direction of the arrows.

Referring now to FIG. 6, the truck tractor 50 has dual wheels in tandem arrangement mounted by appropriate suspension means to the frame rail 53. Safety guard 54 is provided according to another embodiment of the invention wherein a continuous rubber sheet extends from a lower marginal edge 56 vertically at 57 in front of the front set of duals and then upward and rearward at a 45° angle to a portion 58 extending horizontally over the tops of the wheels and then downwardly at a 45° angle to the vertical portion 59 continuing to the lower marginal edge 61. A pair of spring steel strips are mounted on the outside face of this sheet in parallel horizontally spaced relationship and are co-extensive with the sheet, strip 62 being the outboard strip and strip 63 being the inboard strip. Similarly, a pair of spring steel strips is provided on the inner face of the rubber sheet from the lower marginal edge 61 to the lower marginal edge 56, the outboard strip 64 being immediately behind and under the strip 62, and an inboard strip 66 immediately behind and under a strip 63. In the embodiment illustrated in FIGS. 6, 7, and 8, these strips are secured to the sheet by a plurality of screws and nuts shown schematically at 67, for example.

At the front of the vertical portion of the guard in front of the front set of duals, a support bar 68 is provided, extending horizontally from a channel shaped bracket portion 69 affixed to the frame rail 53. Similarly, at the rear face of the sheet portion 59 behind the rear duals, the bar 71 extends across the strips 62 and 63 and has a "C" or channel shaped bracket portion 72 fittingly received upon the frame side rail 53 and affixed thereto by suitable fasteners 74 such as Allen screws or hexagonal head bolts. Screw and nut assemblies 76 affix the bar 71 to the strips 62 and 63, as well as strips 64 and 66 to thereby affix the sheet to the bars at this horizontal line. Because the strips 62 and 63, 64 and 66 are spring steel, and are preformed as shown, they serve to support the horizontal portion 58 of the sheet above the duals as shown, without any further support. Moreover, they limit the possible swing of the flap portion below the mounting bars both at front and rear and caused by air currents, so that there is no interference with the tires at front and so that suitable splash protection of following vehicles is provided at the rear. On the other hand, as discussed above with reference to the other embodiments the tractor can be backed into curbs, docks, or other obstructions without damaging or permanently distorting the safety guard.

Figure 7:
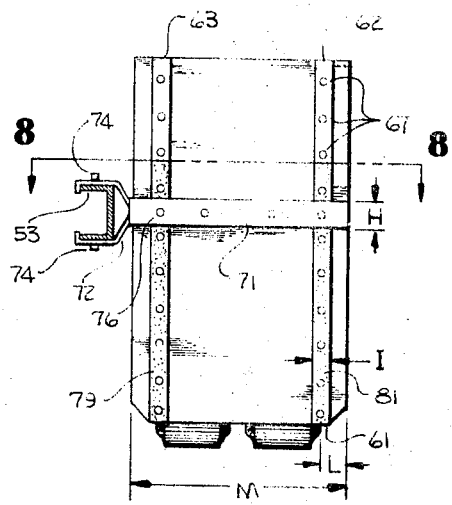
FIG. 7 is an enlarged rear elevational view taken at line 7—7 of FIG. 6 and viewed in the direction of the arrows.
Figure 9:
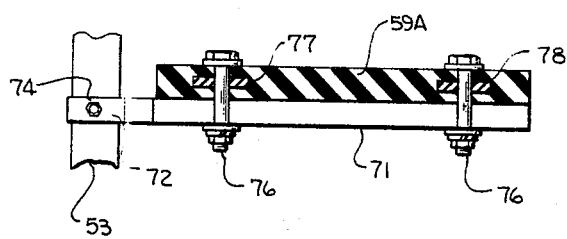
FIG. 9 is a further enlarged section like FIG. 8 but showing an alternative embodiment wherein the spring steel strips are embedded in the rubber sheet.

Referring now to FIG. 7, bar 71 is provided with the same type of mounting to the frame side rail but bolt and nut assemblies 76 do not engage strips on the outside surface of the sheet 59A, because this embodiment employs the strips 77 and 78 molded into the rubber. In this case, the strips are typically two inches wide and .070 inch thick in contrast to the .035 inch thick strips used in the previously described embodiment sandwiching the rubber between them.

Typical dimensions of components and spacings appearing in FIGS. 6 and 7 are as follows:

A, 4 inches loaded, 8 inches unloaded
B, 36 inches
C, 45 degrees
D, 13 degrees
E, 8 inches
F, 4 inches
G, 100 inches
H, 4 inches
I, 2 inches
J, 24 inches
L, 4 inches
M, 24 inches As in the previously described embodiment, reflective sheeting strips are adhesively attached at 79 and 81 to the rear faces of the rear steel strips extending from the lower margin of the flap at 61 up to a point where the flap begins its forward incline of 45 degrees toward the top portion 58. Accordingly, protection for following motorists is provided as described above with reference to the other embodiments.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:
1. The combination comprising:
a vehicle having road wheels mounted thereto;
a heavy flexible sheet;
first and second resilient normally planar strips of spring metal secured to said sheet, said strips being of substantially greater width than thickness;
rigid mounting means affixed to said strips and to said vehicle and suspending a first portion of said sheet behind said wheels, said strips acting upon said sheet portion when said sheet portion is flexed by external forces, to restore said sheet portion to a planar vertical condition and thereby minimize action of said sheet relative to said vehicle and said wheels caused by wind forces;
a second portion of said sheet extending over the tops of said wheels;
said spring metal strips extending from said first portion to said second portion of said sheet and secured to both portions of said sheet;
a third portion of said sheet extending down in front of said wheels, said spring metal strips extending to said third portion;
said mounting means including:
a first generally horizontal bar extending parallel to the rotational axis of said wheels and behind said wheels in horizontally spaced relation thereto, and affixed to said strips behind said wheels, said bar having a mounting channel at an inner end thereof fittingly received on a longitudinal frame rail of said vehicle and affixed thereto by adjustable fastener means;
a second generally horizontal bar extending parallel to said first bar and in front of said wheels in horizontaly spaced relation thereto, and affixed to said strips in front of said wheels, said second bar having a mounting channel at an inner end thereof fittingly received on said frame rail and affixed thereto by adjustable fastener means.

References Cited

UNITED STATES PATENTS

| | | | |
|---|---|---|---|
| 2,091,910 | 8/1937 | Cohen | 280—154.5 |
| 2,771,304 | 11/1956 | La Pere | 280—152 |
| 2,774,610 | 12/1956 | Ratcliffe | 280—152 |
| 3,051,508 | 8/1962 | Federspiel | 280—154.5 |
| 3,116,072 | 12/1963 | Robb et al. | 280—154.5 |
| 3,319,976 | 5/1967 | Eckermann | 280—154.5 |
| 3,333,868 | 8/1967 | Sogoian | 280—154.5 |
| 3,337,238 | 8/1967 | Weasel | 280—154.5 |

BENJAMIN HERSH, Primary Examiner

R. R. SONG, Assistant Examiner